United States Patent [19]

Mazzeo et al.

[11] 3,721,647

[45] March 20, 1973

[54] ONE-PACKAGE HEAT-CURABLE URETHANE POLYMER CASTING COMPOSITION

[75] Inventors: Michael P. Mazzeo, Hightstown, N.J.; Riad H. Gobran, Levittown; Anthony F. Santaniello, Newtown; Marina N. Gillis, Morrisville, all of Pa.

[73] Assignee: Thiokol Chemical Corporation, Bristol, Pa.

[22] Filed: Dec. 20, 1971

[21] Appl. No.: 210,195

Related U.S. Application Data

[63] Continuation-in-part of Ser. No. 77,354, Oct. 1, 1970, abandoned.

[52] U.S. Cl...260/45.7 R, 260/77.5 SS, 260/77.5 TB
[51] Int. Cl............................C08g 51/58, C08g 22/32
[58] Field of Search..260/75 NH, 77.5 TB, 77.5 AM, 260/77.5 SS, 45.7 R

[56] References Cited

UNITED STATES PATENTS

| | | | |
|---|---|---|---|
| 2,733,261 | 1/1956 | Seeger et al. | 260/77,5 TB X |
| 2,801,990 | 8/1957 | Seeger et al. | 260/77.5 TB X |
| 3,084,182 | 4/1963 | McElroy | 260/77.5 TB X |
| 3,179,625 | 4/1965 | Ehrhart | 260/77.5 SS X |
| 3,252,848 | 5/1966 | Borsellino | 260/77.5 AM X |
| 3,499,852 | 3/1970 | Schroeder et al. | 260/77.5 TB X |

OTHER PUBLICATIONS

Dictionary of Organic Chemical Cpds., Vol. 3, Oxford (New York) 1965, page 1660.

Primary Examiner—Donald E. Czaja
Assistant Examiner—H. S. Cockeram
Attorney—Thomas W. Brennan

[57] ABSTRACT

A one-package heat-curable urethane polymer casting composition which comprises three components is disclosed. The first component is a urethane prepolymer in which the isocyanate terminals have been blocked with a high molecular weight, solid, non-volatile, substituted phenol. The second component is a curative diamine in curative amounts. The third component is an organic acidic material in stabilizing amounts. The resultant composition of these components is stable at ambient temperature conditions. On the application of heat, however, this composition forms a void-free polyurethane which maintains its desirable urethane properties. Said composition is designed to be cast into thick sections, as opposed to thin films or coatings.

20 Claims, No Drawings

ONE-PACKAGE HEAT-CURABLE URETHANE POLYMER CASTING COMPOSITION

CROSS REFERENCE TO RELATED APPLICATION

This application is a continuation-in-part of application Ser. No. 77,354, filed Oct. 1, 1970 and now abandoned.

BACKGROUND OF THE INVENTION

1. Field of the Invention

This invention relates to one-package high molecular weight urethane casting polymers, a process for producing the same, and a casting produced therefrom. More particularly, this invention relates to the preparation of a one-package urethane polymer composition which may be cast to yield a solid, void-free polyurethane section. More particularly, this invention relates to the preparation of a solid polyurethane elastomer which is produced by the heat-curing of a blocked urethane prepolymer which is in a single package with a curative and stabilizing organic acid.

Polyurethane elastomers are extremely useful because of their characteristic properties which include high strength, abrasion resistance, and hardness. Thus they are widely used in diverse applications such as for example, heel lifts and small industrial wheels.

2. Description of the Prior Art

It is conventional in the art to form polyurethane elastomers by first forming a basic intermediate which is a low-molecular-weight polymer with hydroxyl endgroups. The basic intermediate is then reacted with an aromatic diisocyanate to give an isocyanate-terminated polyol which is termed the prepolymer. The finished polyurethane is then prepared by admixing the prepolymer with a curative such as a glycol, a diamine, a diacid, or an amino alcohol.

However, the prepolymer and the curative react very rapidly, having a "pot life" of, typically, only minutes before the mixture sets up. Also, the amounts of these two conventional reactants must be precisely controlled to provide the critical stoichiometry which will lead to a useful cured rubber. Furthermore, the prepolymer is sensitive to atmospheric moisture and must be handled with care to prevent premature reaction of the isocyanate (NCO) terminals.

The present state of the art for polyurethane casting polymers is to provide a two-package system wherein one package contains the prepolymer with the active NCO terminal groups and the other package contains the curative as is disclosed in prior U.S. Pats. such as Nos. 2,801,990 and 3,084,182. This system has several disadvantages. Four of the more undesirable features are that (1) the ingredients of the two packages must be mixed shortly before use because of the short pot life mentioned previously, (2) the ingredients must be measured exactly immediately prior to casting the polymer which requires expensive and special metering and mixing equipment, (3) the cumbersomeness of the two package system, and (4) the toxic hazards due to the dust and fume exposure of the metering operation.

Blocked isocyanate prepolymers are isocyanate derivatives that are essentially unreactive at ordinary or ambient temperatures, thereby allowing them to be mixed with curatives (active hydrogen containing compounds), but which react like isocyanates when raised to a high temperature. These blocked prepolymers have been used in a single package in the past to make thin films or coatings only, as shown in U.S. Pat. Nos. 2,984,645; 3,084,182; 3,252,848 and 3,499,852. However, these compounds have not produced satisfactory thick castings due to the reduced urethane properties and the holes or voids in the casting caused by the volatilization of the blocking agent.

These thermolabile blocked isocyanates are the reaction products of isocyanate-terminated prepolymers with blocking agents which are adduct-forming compounds that are simple mono-reactive materials containing a reactive hydrogen atom. The reaction products are frequently referred to as isocyanate adducts. These adducts are occasionally referred to as "isocyanate generators", the implication being that they actually dissociate on heating to thereby form free isocyanate groups which then react in the usual way. However, some of those skilled in the art believe that these masked isocyanates produce some, if not all, of their curing effects by an interchange mechanism analogous to ester-interchange.

The temperature at which such "adducts" afford isocyanate-type cures depends upon the nature of both the isocyanate prepolymer and the blocking agent, as well as that of the curative. Blocking agents that have been previously employed in the production of urethane films include imines, oximes, amines, alcohols, and phenol. For a given isocyanate, phenol adducts are among the most labile and are very reactive at about 150°C.

Blocked isocyanates of the above types have been tried in a variety of solid polyurethane applications, as opposed to foamed polyurethane. Their use in practice has been limited, however, due to a number of deleterious problems and side effects. These include (1) the release of objectionable odors from a phenol blocking agent; (2) the difficulty in obtaining a satisfactory cure at temperatures below about 150°C; (3) the holes or voids in the finished casting caused by the escaping blocking agent; (4) the poor physical properties due to the previously mentioned holes; and (5) the incompatibility of the blocking agent with the cured polyurethane polymer causing the blocking agent to "bleed out" of the molded product and to form a powder or oily film on the surface of the product. These problems are unimportant in thin-film systems or surface coatings or adhesives, but in the preparation of thick castings they are extremely critical.

Most important to this invention, previous attempts at achieving the combination in a single package of the reactants necessary for a rapid-curing polyurethane have been largely unsuccessful. In particular, the resulting cured polymer product did not possess the properties typical of a conventionally prepared polyurethane, especially when used to produce a solid polyurethane section which has a thickness greater than 1 inch. Specifically, the resulting polymer was not both elastomeric and strong.

Accordingly, it is an object of this invention to provide an improved process for unblocking and curing a blocked isocyanate prepolymer in a single package with a curative and a stabilizer.

Another object is to provide an improved one-package heat-curable urethane polymer casting composition.

Another object is to provide cured polyurethane elastomeric sections which are restricted in thickness only by the characteristics of the mold.

It is a particular object of this invention to prepare a one-package urethane casting composition which will produce solid, void-free castings from about one-sixteenth inch thick, to a maximum thickness limited only by the capacity of the mold.

SUMMARY OF THE INVENTION

In accordance with the above and other objects of this invention, a pourable liquid resin composition comprising various components present in a single package in a non-reactive state at conditions of ambient temperature has been provided. Said single-package composition, upon brief application of heat at conventional curing temperatures, can be readily activated to provide a solid, void-free polyurethane elastomeric rubber having the properties of a conventionally formed polyurethane, even when cast into a thick section of, for example, 2 inches. Specifically, these properties include ultimate tensile strength, elastic modulus, and tear strength.

The non-reactivity of the two principle components of the single package, a urethane prepolymer and an amine curative, at temperatures below the cure temperature is effected by a deactivation of the normally reactive isocyanate terminal of the original prepolymer. This is accomplished by having the prepolymer component present in the single package in its blocked form which is prepared from the catalyzed reaction of the prepolymer with a high molecular weight, non-volatile phenolic (substituted phenol) compound. This blocked prepolymer exhibits relative stability at ambient temperatures when co-mixed with the curative amine. Upon the application of conventional curing temperatures, unblocking results and a cured rubbery void-free polyurethane is obtained even when cast into sections up to about 8 inches thick. This single package can be formed into a solid polyurethane rubber having the properties of a conventionally formed polyurethane even when cast into a thick section up to about inches, merely by the brief application of heat. Additionally, and quite unexpectedly, the incorporation of an organic acid in the single-package composition in small, additive, stabilizing concentrations further enhances the stability of the package, providing a prolonged shelf life for the package at ambient conditions, by preventing the displacement of the blocking agent by the curative amine which is present in the one package composition.

DESCRIPTION OF THE PREFERRED EMBODIMENT

Unmodified prepolymers which may be employed in accordance with this invention are the isocyanate-terminated products formed from the reaction of a diisocyanate with a polyalkylene ether glycol or with the esterification product of a polyol and a dicarboxylic acid. The diisocyanate is preferably aromatic. Examples are tolylene diisocyanate; diphenylmethane diisocyanate; metaphenylene diisocyanate; 4-chlorophenylene-1,3-diisocyanate; biphenylene-4,4'-diisocyanate; 3,3'-dimethoxybiphenylene-4,4'diisocyanate; naphthalene-1,5-diisocyanate; and tetrahydronaphthlene-1,5-diisocyanate. The polyol may be difunctional or multifunctional.

This NCO-terminated urethane prepolymer may be formed by first reacting a polyol with an organic diisocyanate. The following is a general example:

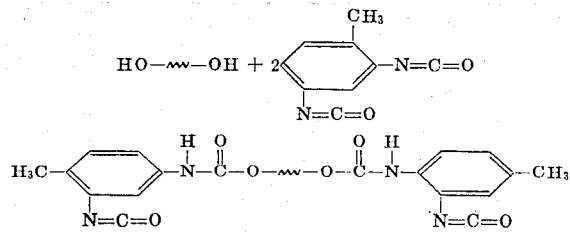

More specifically, the urethane prepolymers which may be blocked to form the blocked prepolymers employed in the novel compositions of this invention are NCO terminated materials which may have an ester, ether, hydrocarbon, polysulfide, thioester, or thioether backbone. Such urethane prepolymers and their preparation are described, for example, in "Polyurethanes: Chemistry and Technology", by J. H. Saunders and K. C. Frisch, Interscience Publishers, New York (1962), and in U.S. Pat. No. 2,929,800. In the present invention the ether type materials are preferred. These preferred polyethers more preferably include polytetramethylene ether glycols. Polyether materials of this type which may be used include those sold under the trade name Polymeg such as Polymeg 2000, available from Quaker Oats Co. The prepolymer which will subsequently be blocked is formed by reacting the backbone raw material, preferably an ether, with one or more diisocyanate containing materials such as tolylene diisocyanate or diphenylmethane diisocyanate, otherwise called methylene-bis-(phenylene-4-)diisocyanate, in proportions such that the resulting prepolymer (precursor) has an active NCO content of about 2 to 9 percent by weight. Other prepolymers may have an active NCO content of about 1 to 18 percent.

Other especially useful polyether polyols are of the polypropylene glycol type which may be either diols or triols. These are available commercially under the trade name of Niax polyols from Union Carbide Corp.

Polyesters may also be employed in the preparation of urethane prepolymers. Examples of suitable polyesters are the reaction products of ethylene glycol, propylene glycol, and adipic acid, of butanediol and adipic acid; of butanediol and azelaic acid; or of ethylene glycol, propylene glycol, trimethylol propane and adipic acid.

Another suitable group of polyols (of the hydrocarbon backbone type) are the poly B-D group of polyols which are liquid hydroxy-terminated polybutadiene homo-and copolymers as available from Sinclair Oil Company. These are known in the trade as poly B-D R-15M and R-45M, which are the homopolymers of 200 poise and 50 poise viscosity, respectively. Copolymers which are liquid and are based on the hydroxy terminated polybutadiene resins and also available from the same source are the poly B-D CS-15 butadienestyrene copolymers of about 75 percent weight percent butadiene and 25 percent weight percent styrene in the resins, and having a viscosity of about 25 poises, and Poly B-D CN-15 butadieneacrylonitrile copolymers of about 85 percent by weight of butadiene and 15 percent by weight of acrylonitrile in the polymer and having a viscosity of about 500 poise.

A further polyol and prepolymer (of the polysulfide backbone type) useful for the present purpose is disclosed in U.S. Pat. No. 3,386,963 by Santaniello and incorporated herein by reference. Briefly, this polyurethane prepolymer is derived from a hydroxy-group-containing polysulfide polymer and a diisocyanate reacted such that the ratio of isocyanate groups to hydroxyl groups is between 1 and 4.

Polyols of the thioether backbone type may also be employed in accordance with the invention. Hydroxy-terminated polythioethers may be prepared by the polymerization of propylene sulfide, or by condensation of mercaptoethanol/mercaptopropanol combinations, or by the etherification of thiodigylcol by itself or in combination with formaldehyde. (Terminal mercaptan groups can be converted to hydroxyls by reaction with propylene oxide).

The blocking agent to be used with the isocyanate prepolymer to prevent the prepolymer from reacting prematurely must possess several critical properties so that the finished casting will be satisfactory.

The ideal blocking agent must be able to block the NCO groups sufficiently so that the NCO terminated prepolymer when blocked can be mixed with the amine curative without a reaction taking place until heat is applied for unblocking. No blocking agents were found that by themselves would accomplish this requirement. It was discovered that the more basic the amine curative the harder it was to prevent it from reacting with the blocked urethane prepolymer. However, the non-volatile, high molecular weight, substituted phenolic compounds which are employed in this invention were the most successful in preventing the reaction. The substituted phenolic compounds used in this invention block the NCO groups, even without a stabilizer, to such an extent that the reaction takes place very slowly. Due to the slowness of the reaction the shelf-life of the one package system is greatly enhanced.

Another equally important property which the blocking agent must possess in the casting polymer system is that of being non-volatile. This property is important when the blocking agent is released, by heating the casting polymer during the curing operation, so that the blocking agent does not volatilize into the surrounding polyurethane molded product. If volatilization were to occur, the blocking agent would cause bubbles to form in the molded product. The specific substituted phenolic compounds suitable for use in this invention do not volatilize within the polyurethane casting polymer during the casting process. Therefore, no bubbles or voids are formed in the finished product.

While some of the phenolic compounds do volatilize generally, the term "non-volatile" when referring to these compounds means they do not volatilize under the particular conditions of use in this invention; i.e., these high molecular weight phenolic compounds when released from the prepolymer inside the urethane casting polymer during the curing stage do not cause bubbles to form inside the molded polymer, whereas, the low molecular weight phenols will volatilize under these conditions and cause bubbles or voids to form inside the molded polymer.

Another critical property which the blocking agent must possess is the property of being compatible with the polyurethane casting polymer after the blocking agent has been released within the polyurethane casting polymer itself. This property is necessary since a large portion of the blocking agent remains in the polymer after curing has completely occurred. Were the blocking agent to be incompatible with the cured polyurethane polymer, then the blocking agent would slowly bleed out of the molded product giving off an undesirable odor and forming a powder or oily film on the surface of the product.

These properties are critical only when thick castings of polyurethane are made. When a thin film is desired, almost any blocking agent will be satisfactory as it will evaporate from the thin film during the curing process thereby making bleed out not a problem later on.

Therefore, the blocking agents which are suitable for this invention are the non-volatile, high molecular weight, substituted phenolic compounds. Particularly suitable are the bisphenols, di- and tri-hydroxy substituted benzenes, and substituted phenols where the substituent is on the aromatic nucleus, all of which are compounds with molecular weight above about 110. The preferred blocking agents are the monofunctional high molecular weight substituted phenols in which the molecular weight is above 150. Most preferred is para-phenyl-phenol.

In forming the blocked prepolymers, the prepolymer and blocking agent are reacted in the ratio of approximately one, or slightly less, equivalent or mole of active —NCO units to 1 mole of substituted phenolic blocking agent. If too much prepolymer is employed, an unstable system which tends to gel will be obtained. Too much blocking agent is also undesirable. It is preferable to react the prepolymer and the blocking agent in the presence of a catalyst.

Catalysts which may be employed for the reaction of the substituted phenol with the isocyanate terminal of the prepolymer are preferably tertiary amines or metallo-organics.

The blocking of the prepolymer reaction occurs according to the following general formula:

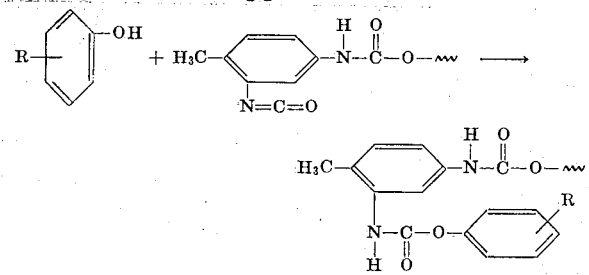

wherein R stands for any substituent(s) on the phenol which will result in the high molecular weight, non-volatile substituted phenol which is suitable for use as the blocking agent of this invention.

The above blocked prepolymer is combined with a diamine curative in order to produce a strong polyurethane cured molded produce after the prepolymer is unblocked during the molding operation. A diamine-isocyanate linkage provides a "hard block" which is responsible for the exceptional strong urethane properties. This has generally been used previously in the two package polyurethane casting polymer systems. In this amine cure, the NCO groups when unblocked undergo an addition reaction with active hydrogen atoms on the nitrogen of the amine.

The resulting urea groups are very important in casting polymers since they provide aromatic hard groups and a high degree of hydrogen bonding, which enhance the toughness of the cured polyurethane molded product.

Therefore, the preferred curatives of this invention are any of the various aromatic diamines or other multifunctional aromatic amines, including mixtures thereof. Illustrative examples are m-phenylenediamine, cumenediamine/m-phenylenediamine in a 50/50 mol percent blend, methylene dianiline, methylene bis(o-chloroaniline), 3,3'-dichloro-4,4'-diaminobiphenyl, chloro-m-phenylenediamine, and 3,3'-4,4'-tetraaminobiphenyl.

These curatives are present in general curative amounts which is from about 1 to 12 percent of the composition. Preferably 1-8 percent of the composition, and most preferably 2-5 percent of the total weight of the composition is the diamine curative.

The general reaction for the cure of an active isocyanate-terminated prepolymer with a diamine such as p-phenylenediamine is as follows:

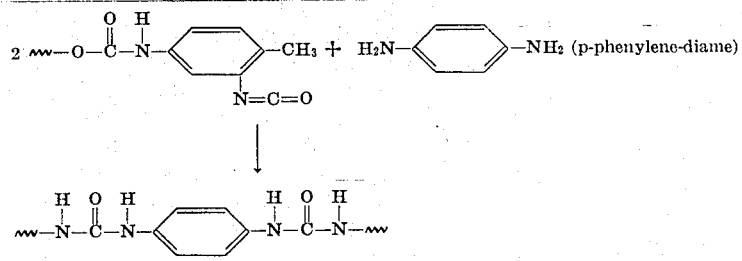

The general reaction for the cure of a blocked urethane prepolymer with a diamine is the same as above except for the additional release of two molecules of the blocking agent per molecule of the diamine.

If the blocked prepolymer of this composition were put in a one-package system with just the curative there would be a slow reaction between them which would limit the shelf-life of the composition to only a few days. However, the addition of a stabilizing amount of an organic acid is added to the one-package system to prevent the displacement of the substituted phenolic blocking agent by the amine curative which is present. The organic acid is added to give stability to the blocked prepolymer-curative composition. The following reaction would take place without the acid.

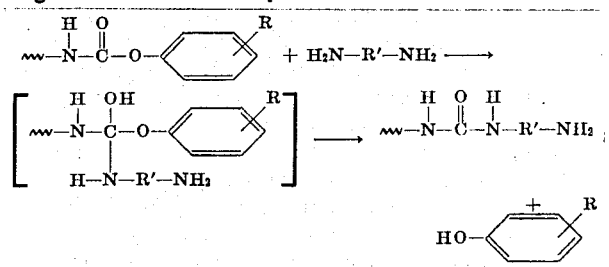

This reaction is affected by the basicity of the amine; i.e., if the amine is a strong base and rich in electrons, then the reaction is very difficult to completely prevent even with the stabilizing acid present.

Therefore, this invention uses less basic amines such as the aromatic diamines above, together with an organic acid in making a stable one-package polyurethane casting polymer composition.

Acidic materials preferred for use as stabilization aids are organic acids such as acetic, adipic, acrylic and cinnamic acids. These acids are present in stabilizing amounts; i.e. about 0.3–3 percent by weight of the composition, preferably, 0.5–2 percent, and most preferably 0.6–1.5 percent.

If desired, the one package compositions of this invention may further have included therein in catalytic quantities a cure catalyst (cure accelerator) such as lead octoate.

The following non-limiting illustrative examples will serve to more clearly illustrate the preferred operation of this invention. Unless otherwise stated, all parts, proportions or percentages are by weight.

EXAMPLE 1

A prepolymer is prepared as follows.

3,527.5 grams of poly (tetramethylene ether) glycol, molecular weight 1990, are charged into a 5-liter resin pot fitted with a cold water condenser stirrer, and heating mantle, and heated under a $N_2$ atmosphere to 100°C. Vacuum is applied for one-half hour at 100°C. $N_2$ flush is then resumed, and the dried polyether is cooled to 65°C. 582.2 grams of tolylene diisocyanate are then added. The reaction mixture is then heated to 90°C. where it is maintained for 5 hours. The resulting prepolymer is discharged into a can and sealed under $N_2$. It is then stored at 65°C overnight.

The prepolymer is blocked and curative (curing agent) agent) and acid are added thereto as follows.

500 grams of the previously prepared warm prepolymer are charged into a 2-liter resin pot. 67.5 grams of para-phenylphenol are then weighed into the prepolymer. The reactor is assembled, and heat (from a heating mantle), agitation (with a double-paddled agitator) and $N_2$ are applied. At 85°C 0.25 grams of triethylenediamine are added. The reaction mixture is then heated to 90°C and allowed to react for 1.5 hours. It is then cooled to 65°C and 18.6 grams of meta-phenylenediamine are then added. The mixture is blended at 65°C for 5 minutes, and finally 5.7 grams of acrylic acid are added and blended in. The product is discharged into a can and sealed under $N_2$. [In the blocking reactions of polyester-based (rather than polyether-based) prepolymers, the blocking reaction is more typically run for 5 hours at 90°C.]

The resulting preferred single-package composition of this invention contains the following three components.

1. The prepolymer of poly(tetramethylene ether) glycol, molecular weight 2,000, and tolylene diisocyanate, reacted in a ratio of 1.9 equivalents NCO/equivalent OH, having isocyanate terminals blocked with paraphenylphenol.

2. Meta-phenylene diamine (1.05 equivalents of dormant NCO/equivalent of $NH_2$).

3. Acrylic acid (1.0 grams/100 grams of blocked prepolymer).

This package has an initial viscosity at 120°F of 630 poises and a stability at 120°F of 12 days or longer.

The above single package is compression-molded at 150°C for one-half hour and post-cured at 90°C for 16 hours to produce a molded product one-eighth inch having the following physical properties:

| | |
|---|---|
| Ultimate tensile | 4200 psi |
| Ultimate elongation | 870% |
| Duro, Shore A | 76 |
| 100% Modulus | 460 psi |
| 300% Modulus | 700 psi |
| 500% Modulus | 1200 psi |
| Tear, Die C | 390 pli |
| Compression set | 42.3% |
| (22 hours, 150°F plied) | |

Additional compression moldings were made which were one-half inch, 1 inch, and 1 ½ inches thick under similar conditions.

EXAMPLE 2

A single package is prepared as in Example 1 but from a blocked prepolymer prepared from an NCO terminated prepolymer based on an ethylene-propylene adipate polyester and tolylene diisocyanate (Thiokol Solithane 291, a registered trademark) and acetic acid (present at a 0.9 percent level, based on the weight of blocked prepolymer). The same proportion in the package of meta-phenylene diamine is employed as in Example 1. Para-phenol phenol was used as the blocking agent as in Example 1.

The resulting package has an initial viscosity at 120°F of 920 poises and a stability at ambient temperature of 72 days or longer.

A ⅛ inch thick molded product prepared using the molding conditions of Example 1 is found to have the following physical properties:

| | |
|---|---|
| Ultimate tensile | 1340 psi |
| Ultimate elongation | 810% |
| Duro, Shore A | 74 |
| 100% Modulus | 440 psi |
| 300% Modulus | 550 psi |
| 500% Modulus | 860 psi |
| Tear, Die C | 205 pli |
| Compression set | 51.7% |
| (22 hours at 150°F., plied) | |

EXAMPLE 3

A single package is prepared as in Example 2 but employing acrylic acid at a 1.0 percent level, based on weight of blocked prepolymer.

The resulting package has an initial viscosity at 120°F of 900 poises and a stability at 120°F of 41 days or longer.

A molded product prepared using the molding conditions of Example 1 is found to have the following physical properties when using a standard ⅛ inch thick sample:

| | |
|---|---|
| Ultimate tensile | 1420 psi |
| Ultimate elongation | 785% |
| Duro, Shore A | 74 |
| 100% Modulus | 400 psi |
| 300% Modulus | 520 psi |
| 500% Modulus | 810 psi |
| Tear, Die C | 255 pli |
| Compression set, | 52.3% |
| (22 hours at 158°F., plied) | |

EXAMPLE 4

A single package is prepared as in Example 2 but employing para-benzyloxyphenol as the blocking agent.

The resulting package has an initial viscosity at 120°F of about 920 poises and a stability at 120°F of 19-21 days.

A molded product prepared by gel-molding at 150°C for 50 minutes followed by 16 hours of post-curing at 90°C is found to have the following physical properties:

| | |
|---|---|
| Ultimate tensile | 445 psi |
| Ultimate elongation | 520% |
| Duro, Shore A | 72 |
| 100% Modulus | 340 psi |
| 300% Modulus | 375 psi |
| 500% Modulus | 445 psi |
| Tear, Die C | 145 pli |

EXAMPLE 5

A single package is prepared as in Example 2 but employing para-cumylphenol as the blocking agent and further having included therein 1 percent lead octoate (a cure catalyst).

The resulting package has an initial viscosity at 120°F of 700 poises and a stability at 120°F of 10 days.

A molded product prepared using the molding conditions of Example 1 is found to have the following physical properties:

| | |
|---|---|
| Ultimate tensile | 845 psi |
| Ultimate elongation | 650% |
| Duro, Shore A | 71 |
| 300% Modulus | 465 psi |
| 500% Modulus | 600 psi |
| Tear, Die C | 200 pli |
| Compression set | 55.1% |
| (22 hours at 158°F., plied) | |

EXAMPLE 6

A single package is prepared as in Example 2 but employing cinnamic acid (present at a 1.5 percent level, based on the weight of blocked prepolymer).

The resulting package has an initial viscosity at 120°F of 900 poises and a stability at 120°F of at least 15 days.

A molded product prepared using the molding conditions of Example 1 is found to have the following physical properties:

| | |
|---|---|
| Ultimate tensile | 1590 psi |
| Ultimate elongation | 790% |
| Duro, Shore A | 75 |
| 300% Modulus | 550 psi |
| 500% Modulus | 880 psi |
| Tear, Die C | 260 pli |
| Compression set | 35.6% |
| (22 hours at 158°F., plied) | |

EXAMPLES 7-10

Four different single packages all containing the following components are prepared as in Example 2.

1. The prepolymer Solithane 291 blocked with para-phenylphenol.
2. Adipic acid, 0.8 grams/100 grams of blocked resin.
3. An aromatic diamine curing agent (1.05 equivalents of dormant NCO/equivalent of $NH_2$).

A molded product is prepared from each single package by molding at 150°C for 30 minutes followed by 16 hours of post-curing at 100°C.

The particular aromatic diamine employed in formulating each package and the resulting package properties and molded product properties are listed in Table I below.

TABLE I

| Example | Choice of aromatic diamine curing agents | | | |
|---|---|---|---|---|
| | 7 | 8 | 9 | 10 |
| Physical properties of molded product | Methylene dianiline (MDA) | Methylene bis[ortho-chloro-aniline] (MOCA) | 3,3'-dichloro-4,4'-diamino biphenyl (CBU) | 50 mol. percent cumene diamine; 50 mol. percent metaphenylene-diamine (Caytur 7) |
| Ultimate tensile, p.s.i. | 1,300 | 860 | 1,100 | 1,770 |
| Ultimate elongation, percent | 795 | 785 | 540 | 895 |
| Duro Shore A | 73 | 58 | 77 | 63 |
| 100% modulus, p.s.i. | 350 | 285 | 490 | 245 |
| 300% modulus, p.s.i. | 450 | 355 | 675 | 300 |
| 500% modulus, p.s.i. | 694 | 485 | 950 | 550 |
| Tear, Die C, pli | 175 | 135 | 200 | 155 |

EXAMPLE 11

A single package containing the following components is prepared as in Example 2.

1. The prepolymer Solithane 291 blocked with 2,2-bis[4-hydroxyphenyl] propane (bisphenol A) in a ratio of 1 mol. of bisphenol A per equivalent of NCO.
2. Caytur 7 curing agent (1.05 equivalents of dormant NCO/equivalent of NH$_2$).
3. Adipic acid in 0.2 percent concentration, based on weight of blocked resin.

The resulting package has an initial viscosity at 120°F of 1,260 poises and a stability at 120°F of 10 days.

A molded product prepared by compression molding at 150°C followed by 16 hours of post-curing at 100°C is found to have the following physical properties:

| | |
|---|---|
| Ultimate tensile | 850 psi |
| Ultimate elongation | 875% |
| Duro, Shore A | 64 |
| 300% Modulus | 265 psi |
| 500% Modulus | 325 psi |

EXAMPLE 12

Various single packages all containing the following components are prepared as in Example 2.

1. The prepolymer Solithane 291 having its isocyanate terminals blocked with a phenolic compound in a ratio of 1 mole per equivalent of NCO.
2. Caytur 7 curing agent (1.05 equivalents of dormant NCO/equivalent of NH$_2$).
3. Adipic acid, concentration given in Table II (below) relative to weight of blocked resin.

The resulting single packages have a shelf stability or shelf life which varies with the particular phenolic compound employed as the blocking agent and with the level of adipic acid. These results are summarized in Table II below.

TABLE II

EFFECT OF ACID LEVEL ON SHELF LIFE OF PACKAGE AT 120°F.

| Blocking Agent | Bisphenol A | Para-benzyl-phenyl-oxyphenol | Para-phenyl phenol | Pata-phenyl phenol |
|---|---|---|---|---|
| Level of Adipic Acid | | | | |
| None | 3-6 | 1-2 days | 2 days | |
| 0.2 pph | 10-13 days | 9-14 days | 2-5 days | |
| 0.4 pph | 15 days | 9-14 days | 5-7 days | |
| 0.6 pph | | | | |
| 1.0 pph | | | | 9 days |

EXAMPLE 13

A single package is prepared as in Example 1 but where the polyol of the blocked prepolymer is poly(propylene ether)glycol and the stabilizer is acetic acid in a 0.9 percent concentration based on the weight of blocked resin.

The resulting package has an initial viscosity at 120°F., of 220 poises and a stability at 120°F of 10 days.

A molded product prepared using the molding conditions of Example 1 is found to have the following physical properties:

| | |
|---|---|
| Ultimate tensile | 540 psi |
| Ultimate elongation | 700% psi |
| Duro, Shore A | 70 |
| 100% Modulus | 370 psi |
| 300% Modulus | 450 psi |
| 500% Modulus | 500 psi |
| Tear, Die C | 200 pli |
| Compression set | 53.5% |
| (22 hours at 158°F., plied) | |

EXAMPLE 14

A single package casting composition is prepared as in Example 2 with paraphenylphenol as the blocking agent.

A donut shaped molded product with outside diameter 2 inches, inside diameter five-eighths inch, and thickness one-half inch was prepared under the following conditions:

1. The casting composition was preheated to make it flowable;
2. The mold was set at 150°C;
3. The composition was placed in the opened mold for 6 ½ minutes until the gel point was reached;
4. The composition was then compression molded for 10 minutes at 150°C with no post curing.

The resultant "wheel" was found to be completely solid with no voids or bubbles whatsoever.

EXAMPLE 15

A single package casting composition is prepared in accordance with Example 2.

A donut shaped molded product was prepared with outside diameter 7 ⅛ inches, inside diameter 2 ⅜ inches, and thickness 1 ¾ inches.

This product was first formed by gel-molding the composition at 107°C for 1 ½ hours. A second molding was then made by compression molding the composition at 150°C for only 45 minutes.

We claim:

1. A one-package, stable heat-curable urethane casting polymer composition comprising:
   1. a blocked, urethane prepolymer, said prepolymer (a) having a polyester, polyether, hydrocarbon, polysulfide, or polythioether backbone, formed by reacting a polyol with an organic diisocyanate to form a NCO-terminated urethane prepolymer (b) being blocked with a high molecular weight, non-volatile, substituted phenol blocking agent, (c) having an active NCO content as present in the prepolymer prior to blocking of from about 1 percent to about 18 percent by weight, (d) further having a ratio of NCO groups as present in the prepolymer to active hydrogen groups as present in the blocking agent of about 1:1, and (e) having a molecular weight of about 500 to about 8,000 prior to blocking.
   2. a curative amount of a multifunctional aromatic diamine curative; and
   3. a stabilizing amount of an organic acid;
   wherein upon curing said composition produces a void-free casting.

2. A composition as in claim 1 wherein said prepolymer has a backbone selected from the group consisting of polyester and polyether backbones.

3. A composition as in claim 1 wherein said prepolymer has a polyether backbone.

4. A composition as in claim 1 wherein said prepolymer has a poly (tetramethylene ether) backbone.

5. A composition as in claim 1 wherein said organic diisocyanate is tolylene diisocyanate.

6. A composition as in claim 1 wherein said high molecular weight, non-volatile, substituted phenol is monofunctional.

7. A composition as in claim 1 wherein said high molecular weight, non-volatile, substituted phenol is para-phenylphenol.

8. A composition as in claim 1 wherein said substituted phenol has a molecular weight above about 110.

9. A composition as in claim 1 wherein said substituted phenol has a molecular weight above about 150.

10. A composition as in claim 1 wherein said multifunctional aromatic amine curative is difunctional.

11. A composition as in claim 1 wherein said organic acid is selected from the group consisting of acetic acid, adipic acid, acrylic acid, and cinnamic acid.

12. A composition as in claim 1 wherein said blocked prepolymer is the adduct of para-phenylphenol and the reaction product of tolylene diisocyanate and poly(tetramethylene ether) glycol, said curative is metaphenylene diamine, and said organic acid is acrylic acid.

13. A composition as in claim 1 wherein said diamine curative is 1–12 percent by weight of the composition.

14. A composition as in claim 1 wherein said diamine curative is 1–8 percent by weight of the composition.

15. A composition as in claim 1 wherein said diamine curative is 2–5 percent by weight of the composition.

16. A composition as in claim 1 wherein said organic acid is 0.3–3 percent by weight of the composition.

17. A composition as in claim 1 wherein said organic acid is 0.5–2 percent by weight of the composition.

18. A composition as in claim 1 wherein said organic acid is 0.6–1.5 percent by weight of the composition.

19. A process comprising subjecting the composition of claim 1 in a mold to elevated temperature to unblock and cure the residual prepolymer in said mold, thereby forming a fully cured, molded, void-free, solid polyurethane part having elastomeric properties.

20. A process as in claim 19 wherein said molded part has a thickness of at least about one-sixteenth inch.

* * * * *